(12) United States Patent
Oh

(10) Patent No.: US 10,646,047 B2
(45) Date of Patent: May 12, 2020

(54) ADJUSTABLE BED FRAME STRUCTURE

(71) Applicant: Grantec (Xiamen) Co., Ltd., Xiamen (CN)

(72) Inventor: Suk Kan Oh, Xiamen (CN)

(73) Assignee: GRANTEC (XIAMEN) CO., LTD., Xiamen, Fujian (CN)

( * ) Notice: Subject to any disclaimer, the term of this patent is extended or adjusted under 35 U.S.C. 154(b) by 252 days.

(21) Appl. No.: 15/673,430

(22) Filed: Aug. 10, 2017

(65) Prior Publication Data
US 2018/0042389 A1   Feb. 15, 2018

(30) Foreign Application Priority Data

Aug. 11, 2016  (CN) .................... 2016 2 0866654 U

(51) Int. Cl.
| | |
|---|---|
| *A47C 19/04* | (2006.01) |
| *A47C 19/02* | (2006.01) |
| *A47C 19/12* | (2006.01) |
| *F16B 12/54* | (2006.01) |
| *F16B 12/56* | (2006.01) |

(52) U.S. Cl.
CPC ............ *A47C 19/04* (2013.01); *A47C 19/024* (2013.01); *A47C 19/025* (2013.01); *A47C 19/122* (2013.01); *A47C 19/02* (2013.01); *F16B 12/54* (2013.01); *F16B 12/56* (2013.01)

(58) Field of Classification Search
CPC .......... A47C 7/52; A47C 17/32; A47C 17/70; A47C 17/705; A47C 17/76; A47C 19/04; A47C 19/024; A47C 19/22; A47C 19/12; A47C 19/122; A47C 19/02; A47C 20/02; A47C 20/12; A47C 23/005; A47C 19/025; A47D 7/01; F16B 12/54; F16B 12/56
USPC .............................. 5/181, 294, 133, 185, 174
See application file for complete search history.

(56) References Cited

U.S. PATENT DOCUMENTS

| | | | | | |
|---|---|---|---|---|---|
| 1,394,512 | A | * | 10/1921 | Tamarin | ................. A47C 19/04 5/183 |
| 1,810,311 | A | * | 6/1931 | Frey | ....................... A47C 17/70 5/112 |
| 2,983,931 | A | * | 5/1961 | Nelson | .................... F16B 12/54 5/238 |

(Continued)

FOREIGN PATENT DOCUMENTS

| | | | | |
|---|---|---|---|---|
| CA | 2988113 A1 | * | 12/2016 | ............. A47C 19/04 |
| CN | 1307921 C | * | 4/2007 | ............. A47C 17/00 |

(Continued)

*Primary Examiner* — Nicholas F Polito
*Assistant Examiner* — Luke Hall
(74) *Attorney, Agent, or Firm* — Leong C. Lei

(57) ABSTRACT

An adjustable bed frame structure includes a bed frame and bed legs. The bed frame includes a left side rod and a right side rod. A head support rod, a middle support rod and a tail support rod are connected between the left side rod and the right side rod. The head support rod, the middle support rod and the tail support rod each include a left support rod and a right support rod. The left support rod and the right support rod each have a plurality of adjustment holes. The bed legs include side legs and middle legs. Each of the middle legs has a locking portion at a top thereof to mate with the adjustment holes of the left support rod and the right support rod. The width of the bed frame can be adjusted as desired.

5 Claims, 6 Drawing Sheets

(56) References Cited

U.S. PATENT DOCUMENTS

| | | | | |
|---|---|---|---|---|
| 3,680,156 A * | 8/1972 | McKee | ............... | A47C 19/021 5/238 |
| 4,856,127 A * | 8/1989 | Lenger | ............... | A47C 19/022 5/53.1 |
| 5,095,565 A * | 3/1992 | Brown | ............... | A47C 23/05 403/295 |
| 6,035,467 A * | 3/2000 | Lee | ............... | A47C 17/70 5/174 |
| 6,418,578 B1 * | 7/2002 | Polevoy | ............... | A47B 91/00 16/18 CG |
| 7,600,278 B2 * | 10/2009 | Oh | ............... | A47C 19/04 5/174 |
| 8,707,478 B2 * | 4/2014 | Jin | ............... | A47C 19/04 5/112 |
| 8,856,983 B2 * | 10/2014 | Hayek | ............... | A47C 19/04 5/181 |
| 2005/0278848 A1 * | 12/2005 | Polevoy | ............... | A47C 19/005 5/201 |
| 2007/0226902 A1 * | 10/2007 | Lin | ............... | A47C 19/005 5/201 |
| 2012/0137430 A1 * | 6/2012 | Geiger | ............... | A47C 19/02 5/201 |
| 2017/0027333 A1 * | 2/2017 | Shih | ............... | A47C 19/021 |
| 2017/0273467 A1 * | 9/2017 | Huang | ............... | A47C 19/025 |
| 2017/0273468 A1 * | 9/2017 | Polevoy | ............... | A47C 19/04 |

FOREIGN PATENT DOCUMENTS

| | | | | |
|---|---|---|---|---|
| FR | 2749888 A1 * | 12/1997 | ............... | A47C 19/024 |
| WO | WO-2016196731 A1 * | 12/2016 | ............... | A47C 19/04 |

\* cited by examiner

ADJUSTABLE BED FRAME STRUCTURE

BACKGROUND OF THE INVENTION

Field of the Invention

The present invention relates to an iron bed frame, and more particularly to an adjustable bed frame structure.

Description of the Prior Art

Many necessities need to have an adjustment function, especially for the limited space in the room. A bed occupies most of the space of the room. Therefore, a foldable iron bed frame is developed on the market, which can be used conveniently and saves storage space.

Most of bed frames, including wooden bed frames or iron bed frames, are unable to be adjusted. In general, an iron bed frame is in the form of a single bed. It is necessary to combine two single beds for two or more users. This may result in a waste in finance and occupy more space when not use. How to make the iron bed frame adjustable is a problem that needs to be solved.

Accordingly, the inventor of the present invention has devoted himself based on his many years of practical experiences to solve these problems.

SUMMARY OF THE INVENTION

The primary object of the present invention is to provide an adjustable bed frame structure. The width of the bed frame can be adjusted according to the demand.

In order to achieve the aforesaid object, the adjustable bed frame structure of the present invention comprises a bed frame and bed legs. The bed frame includes a left side rod and a right side rod arranged symmetrically. A head support rod, a middle support rod and a tail support rod are connected between the left side rod and the right side rod. The head support rod, the middle support rod and the tail support rod are arranged corresponding to one another and each comprise a left support rod and a right support rod. The left support rod and the right support rod each have a plurality of adjustment holes. One end of the left support rod is connected to the left side rod. One end of the right support rod is connected to the right side rod. Another end of the left support rod is connected to another end of the right support rod. The bed legs include side legs disposed at two ends of bottoms of the left side rod and the right side rod and middle legs disposed at bottoms of the head support rod, the middle support rod, and the tail support rod. Each of the middle legs has a locking portion at a top thereof to mate with the adjustment holes of the left support rod and the right support rod.

Preferably, the left support rod of each of the head support rod, the middle support rod and the tail support rod is a U-shaped structure having an opening facing up. The other end of the right support rod of each of the head support rod, the middle support rod and the tail support rod is fitted in the left support rod.

Preferably, each of the left side rod and the right side rod is a foldable structure. The left side rod comprises two left short rods which are connected together by a left connecting member. The right side rod comprises two right short rods which are connected together by a right connecting member.

Preferably, the left connecting member and the right connecting member are arranged symmetrically. The left connecting member and the right connecting member each include a support plate and two baffles. The support plate has a perforation. The left connecting member and the right connecting member each have a notch formed at a middle portion of one of the two baffles. The notches of the left connecting member and the right connecting member face each other. One end of the left support rod of the middle support rod is inserted through the notch of the left connecting member to be supported on the support plate of the left connecting member. One end of the right support rod of the middle support rod is inserted through the notch of the right connecting member to be supported on the support plate of the right connecting member. The left support rod and the right support rod of the middle support rod each have an aperture corresponding to the perforation of the support plate.

Preferably, each of the left side rod and the right side rod is a single rod. The left side rod and the right side rod each have receiving holes at the two ends and a middle portion of the respective bottoms thereof. The end of each of the left support rods and the right support rods of the head support rod, the middle support rod and the tail support rod, connected to the left side rod/the right side rod, is provided with a U-shaped connecting member having an opening facing up and corresponding to the left side rod/the right side rod. The U-shaped connecting member has an aperture to mate with a corresponding one of the side legs.

Preferably, the U-shaped connecting member is integrally formed with the left support rod/the right support rod of the head support rod, the middle support rod and the tail support rod.

The adjustable bed frame structure of the present invention includes the left support rods and the right support rods of the head support rod, the middle support rod and the tail support rod to mate with each other. The left support rods and the right support rods are provided with the plurality of adjustment holes, and the locking portions of the middle legs are fitted into the overlapped adjustment holes of the left support rods and the right support rods to adjust the width of the bed frame. Therefore, the width of the bed frame can be changed according to the actual need for the user. For example, when the room is large enough or if there are two or more users, the width of the bed frame can be set to the maximum, thereby improving the comfort of the use. When the number of users is small or the space is small, the width of the bed frame can be properly adjusted to meet various needs of users.

DETAILED DESCRIPTION OF THE PREFERRED EMBODIMENTS

Embodiments of the present invention will now be described, by way of example only, with reference to the accompanying drawings.

Figure 1:
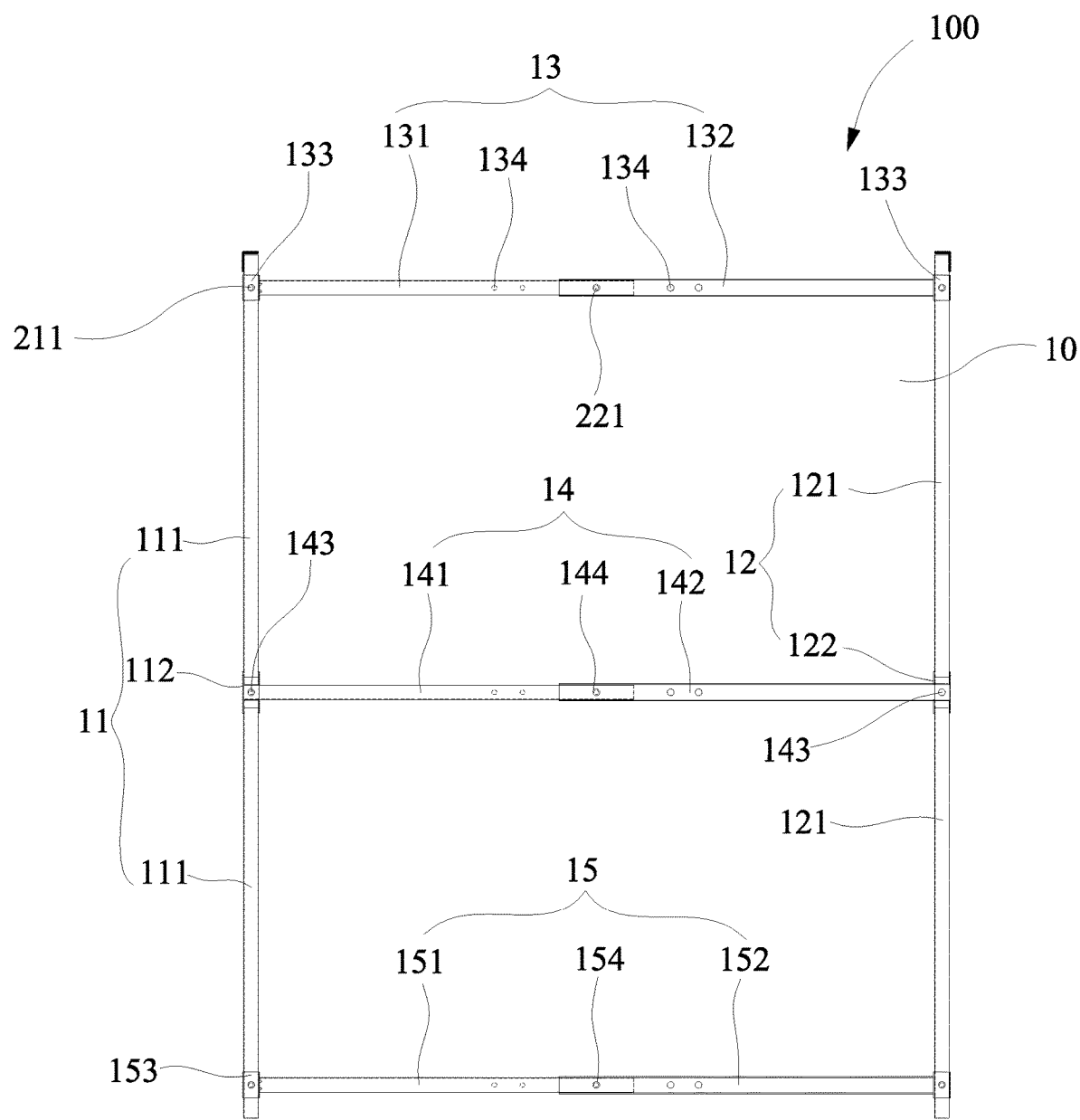
FIG. 1 is a top view showing the maximum width of the bed frame in accordance with a preferred embodiment of the present invention.
Figure 2:
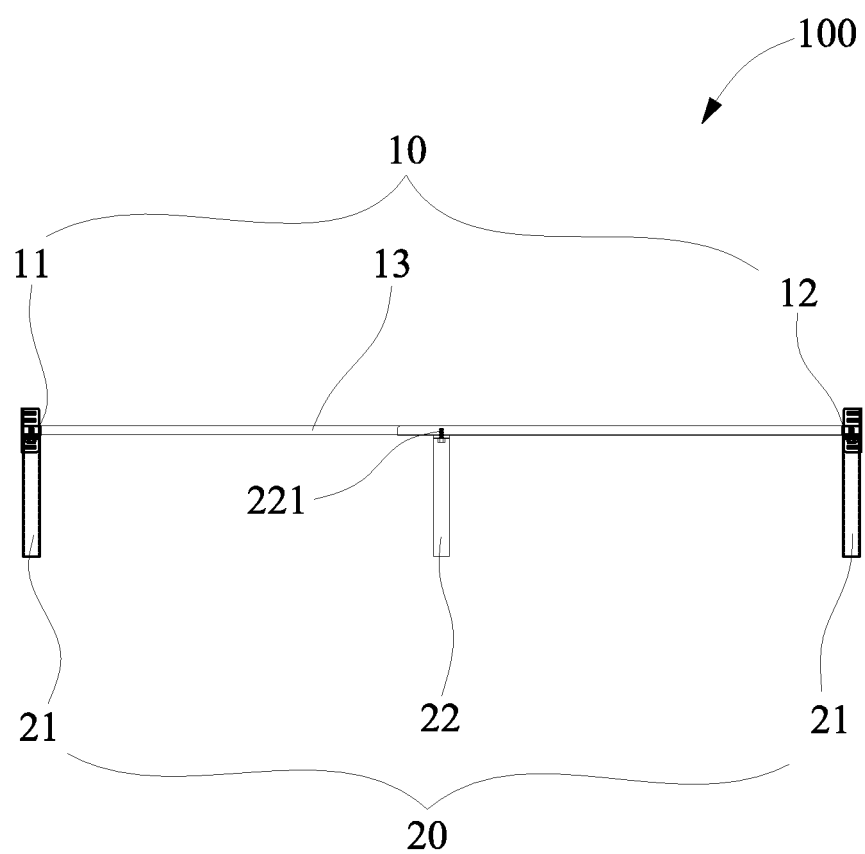
FIG. 2 is a front view showing the maximum width of the bed frame in accordance with the preferred embodiment of the present invention.

As shown in FIGS. 1 and 2, the present invention discloses an adjustable bed frame structure 100. The adjustable bed frame structure 100 comprises a bed frame 10 and bed legs 20.

The bed frame 10 includes a left side rod 11 and a right side rod 12 arranged symmetrically left and right. A head support rod 13, at least one middle support rod 14, and a tail support rod 15 are connected between the left side rod 11 and the right side rod 12.

The left side rod 11 and the right side rod 12 each may be a foldable structure for the convenience of folding and transportation. The left side rod 11 comprises two left short rods 111 which are connected together by a left connecting member 112. Two outer ends of the left side rod 11 each have a receiving hole at a bottom thereof. The right side rod 12 comprises two right short rods 121 which are connected together by a right connecting member 122. Two outer ends of the right side rod 12 each have a receiving hole at a bottom thereof. When each of the left side rod 11 and the right side rod 12 is a single rod, two ends and a middle portion of the left side rod 11 and the right side rod 12 each have a receiving hole at respective bottoms thereof.

The head support rod 13 includes a left head support rod 131 and a right head support rod 132. One end of the left head support rod 131 is provided with a U-shaped connecting member 133 having an opening facing up and corresponding to the left side rod 11. The U-shaped connecting member 133 is integrally formed with the left head support rod 131. One of the left short rods 111 of the left side rod 11 is disposed in the U-shaped connecting member 133 and is connected to the left head support rod 131. One end of the right head support rod 132 is provided with a U-shaped connecting member 133 having an opening facing up and corresponding to the right side rod 12. The U-shaped connecting member 133 is integrally formed with the right head support rod 132. One of the right short rods 121 of the right side rod 12 is disposed in the U-shaped connecting member 133 and is connected to the right head support rod 132. In this embodiment, the left head support rod 131 is a U-shaped structure having an opening facing up. Another end of the right head support rod 132 is fitted in the left head support rod 131. The left head support rod 131 and the right head support rod 132 each have a plurality of head adjustment holes 134.

Figure 7:
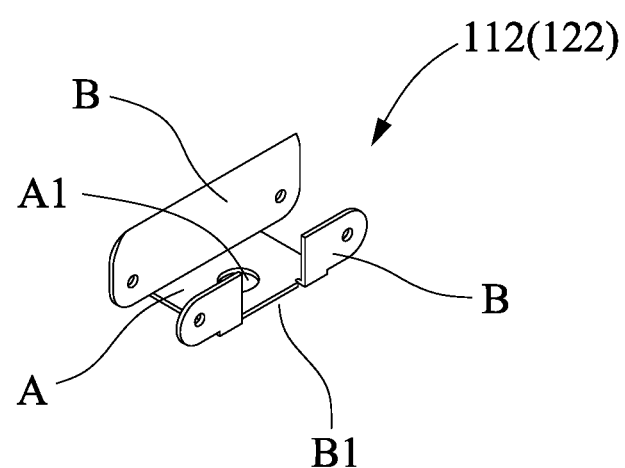
FIG. 7 is a perspective view of the left connecting member (the right connecting member) in accordance with the preferred embodiment of the present invention.

The middle support rod 14 is arranged in correspondence with the head support rod 13, which includes a left middle support rod 141 and a right middle support rod 142. One end of the left middle support rod 141 is connected to the left connecting member 112. One end of the right middle support rod 142 is connected to the right connecting member 122 of the right side rod 12. The left connecting member 112 and the right connecting member 122 are arranged symmetrically and each include a support plate A and two baffles B, as seen in FIG. 7. The support plate A has a perforation A1. The left connecting member 112 and the right connecting member 122 each have a notch B1 formed at a middle portion of one of the two baffles B. The notches B1 of the left connecting member 112 and the right connecting member 122 face each other. One end of the left middle support rod 141 is inserted through the notch B1 of the left connecting member 112 to be supported on the support plate A of the left connecting member 11. One end of the right middle support rod 142 is inserted through the notch B1 of the right connecting member 122 to be supported on the support plate A of the right connecting member 122. The left middle support rod 141 and the right middle support rod 142 each have an aperture 143 corresponding to the perforation A1 of the support plate A. When each of the left side rod 11 and the right side rod 12 is a single rod, the left connecting member 112 and the right connecting member 122 may be U-shaped connecting members integrally formed with the left middle support rod 141 and the right middle support rod 142, respectively. The other ends of the left middle support rod 141 and the right middle support rod 142 are connected to each other. The left middle support rod 141 is a U-shaped structure having an opening facing up. The other end of the right middle support rod 142 is inserted in the left middle support rod 141. The left middle support rod 141 and the right middle support rod 142 each have middle adjustment holes 144 corresponding to the head adjustment holes 134 of the left head support rod 131 and the right head support rod 132.

The tail support rod 15 is arranged in correspondence with the head support rod 13 and the middle support rod 14, which includes a left tail support rod 151 and a right tail support rod 152. One end of the left tail support rod 151 is provided with a U-shaped connecting member 153 having an opening facing up and corresponding to the left side rod 11. One of the left short rods 111 of the left side rod 11 is disposed in the U-shaped connecting member 153 and is connected to the left tail support rod 151. One end of the right tail support rod 152 is provided with a U-shaped connecting member 153 having an opening facing up and corresponding to the right side rod 12. One of the right short rods 121 of the right side rod 12 is disposed in the U-shaped connecting member 153 and is connected to the right tail support rod 152. The other ends of the left tail support rod 151 and the right tail support rod 152 are connected to each other. The left tail support rod 151 is a U-shaped structure having an opening facing up. Another end of the right tail support rod 152 is fitted in the left tail support rod 151. The left tail support rod 151 and the right tail support rod 152 each have tail adjustment holes 154 corresponding to the head adjustment holes 134 of the left head support rod 131 and the right head support rod 132.

Referring to FIGS. 1 and 2, the bed legs 20 include side legs 21 disposed at the two ends and the middle portion of the bottoms of the left and right side rods 11, 12 and middle legs 22 disposed at the bottoms of the head support rod 13, the middle support rod 14, and the tail support rod 15. Each side leg 21 has a locking portion 211 at a top thereof to engage with the receiving holes of the left side rod 11 and the right side rod 12 and the aperture of each U-shaped connecting member 133, 153. Each middle leg 22 has a locking portion 221 at a top thereof. The locking portion 221 is in cooperation with the head adjustment holes 134, the middle adjustment holes 144 and the tail adjustment holes 154.

FIG. 1 and FIG. 2 illustrate the maximum width of the bed frame structure of the present invention. The adjustment holes 134 at the ends of the left head support rod 131 and the right head support rod 132 of the head support rod 13 are aligned, and then the locking portion 221 of the middle leg 22 is inserted in two overlapped adjustment holes 134 to position the maximum width of the bed frame. The middle support rod 14 and the tail support rod 15 are arranged corresponding to the head support rod 13.

Figure 3:
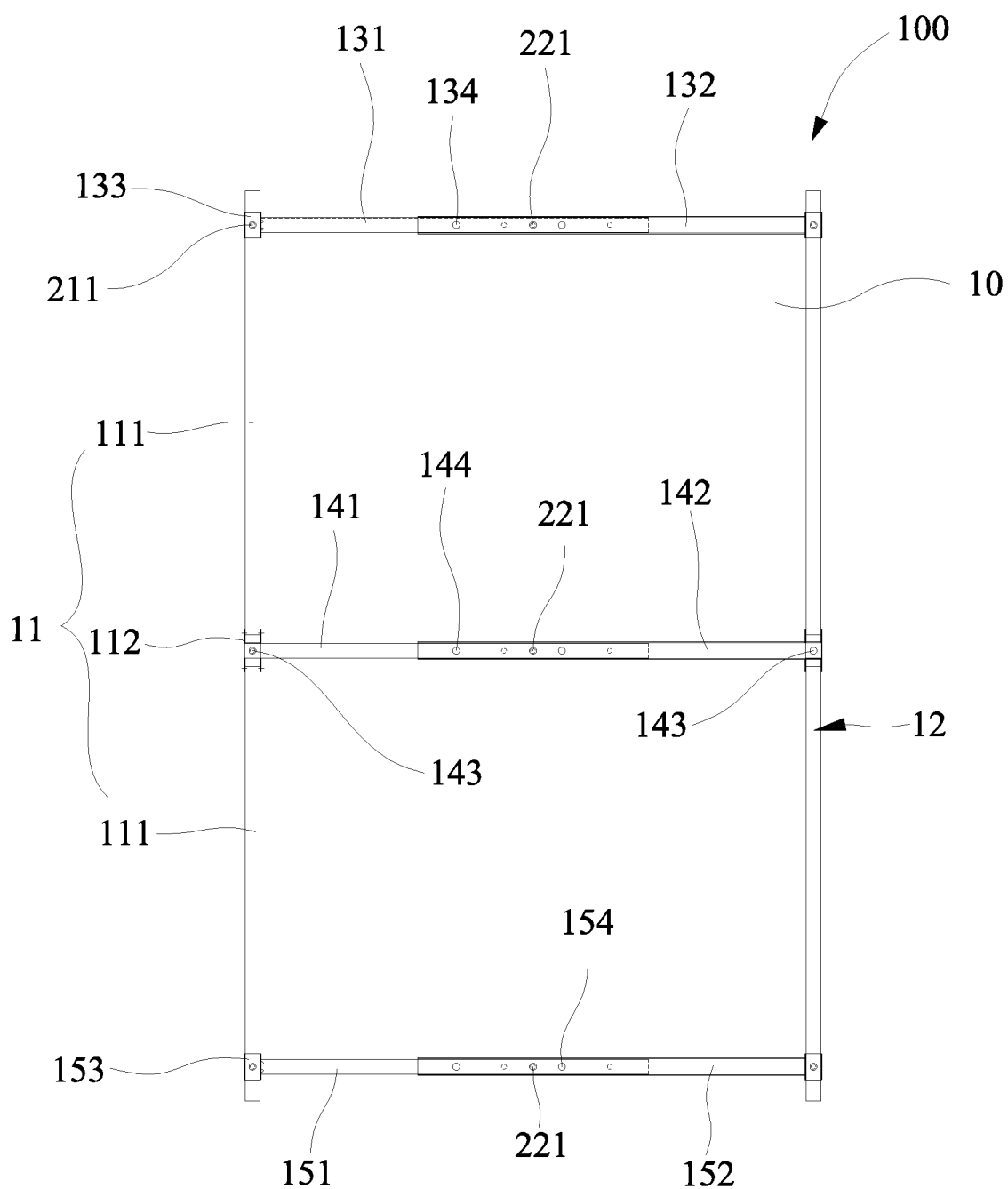
FIG. 3 is a top view showing another width of the bed frame in accordance with the preferred embodiment of the present invention.
Figure 4:
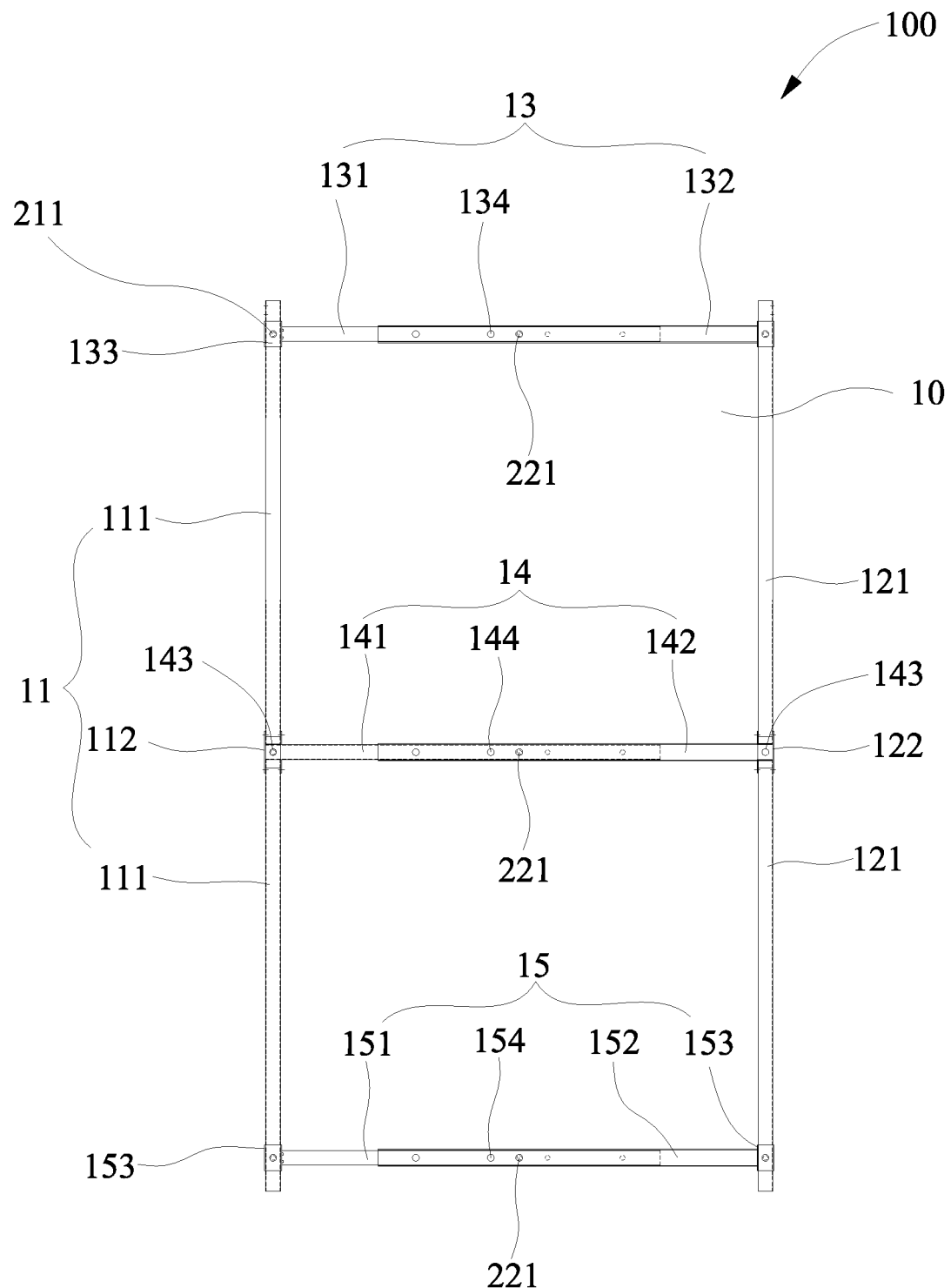
FIG. 4 is a top view showing the minimum width of the bed frame in accordance with the preferred embodiment of the present invention.
Figure 5:
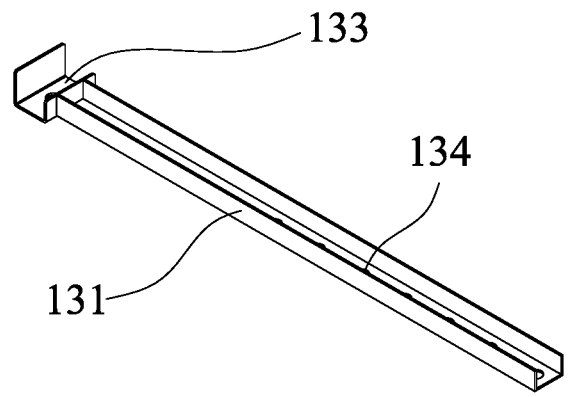
FIG. 5 is a perspective view of the left head support rod in accordance with the preferred embodiment of the present invention.
Figure 6:
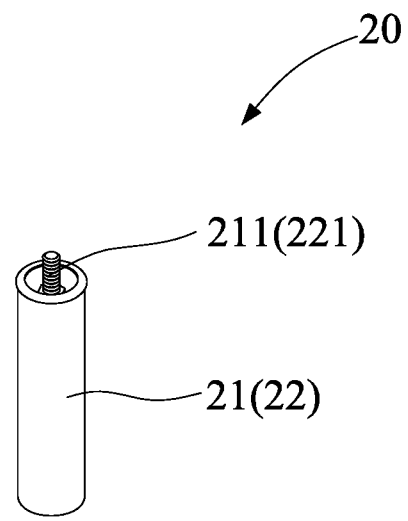
FIG. 6 is a perspective view of the bed leg in accordance with the preferred embodiment of the present invention.

As shown in FIG. 3 and FIG. 4, when the use space is insufficient, the width of the bed frame can be reduced. As shown in the figures, the right support rods 132, 142, 152 are moved toward the left support rods 131, 141, 151, so that the adjustment holes 134, 144, 154 of the left support rods 131, 141, 151 are aligned with the adjustment holes 134, 144, 154 of the corresponding right support rods 132, 142, 152, and then the corresponding locking portions 221 of the middle legs 22 are locked into the overlapped adjustment holes 134, 144, 154 to realize the positioning of the width of the bed frame. When the right support rods 132, 142, 152 are fully inserted in the left support rods 131, 141, 151, the adjustment holes 134, 144, 154 of the right support rods 132, 142, 152 are aligned with the adjustment holes 134, 144, 154 of the left support rods 131, 141, 151, and the width of the bed frame is adjusted to the minimum.

Thus, the adjustable bed frame structure 100 of the present invention includes the left support rods 131, 141, 151 and the right support rods 132, 142, 152 to mate with each other. The left support rods 131, 141, 151 and the right support rods 132, 142, 152 are provided with the plurality of adjustment holes 134, 144, 154, and the locking portions 221 of the middle legs 22 are fitted into the overlapped adjustment holes 134, 144, 154 of the left support rods 131, 141, 151 and the right support rods 132, 142, 152 to adjust the width of the bed frame. Therefore, the width of the bed frame can be changed according to the actual need for the user. For example, when the room is large enough or if there are two or more users, the width of the bed frame can be set to the maximum, thereby improving the comfort of the use. When the number of users is small or the space is small, the width of the bed frame can be properly adjusted to meet various needs of users.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An adjustable bed frame structure, comprising:
 a bed frame including a left side rod and a right side rod arranged symmetrically, the bed frame including a head support rod, a middle support rod, and a tail support rod being connected between the left side rod and the right side rod, wherein the head support rod, the middle support rod, and the tail support rod are arranged corresponding to one another and each comprise a left support rod and a right support rod, the left support rod and the right support rod each having a plurality of adjustment holes, a first end of the left support rod being connected to the left side rod, a first end of the right support rod being connected to the right side rod, wherein the left support rod of each of the head support rod, the middle support rod and the tail support rod is a U-shaped structure having an opening facing up, wherein the plurality of adjustment holes of the left support rod of each of the head support rod, the middle support rod and the tail support rod are at a bottom of the U-shaped structure of its left support rod, and a second end of the right support rod of each of the head support rod, the middle support rod and the tail support rod is fitted in the left support rod; and
 multiple bed legs including side legs disposed at two ends of each of the left side rod and the right side rod at a bottom thereof, and middle legs disposed at bottoms of the head support rod, the middle support rod and the tail support rod, each of the middle legs having a locking portion at a top thereof to mate with one of the adjustment holes of each of the left support rod and the right support rod of one of the head support rod, the middle support rod and the tail support rod.

2. The adjustable bed frame structure as claimed in claim 1, wherein each of the left side rod and the right side rod is a foldable structure, the left side rod comprises two left short rods which are connected together by a left connecting member of the left side rod, and the right side rod comprises two right short rods which are connected together by a right connecting member of the right side rod.

3. The adjustable bed frame structure as claimed in claim 2, wherein the left connecting member and the right connecting member are arranged symmetrically, the left connecting member and the right connecting member each include a support plate and two baffles, the support plate has a perforation, the left connecting member and the right connecting member each have a notch formed at a middle portion of one of the two baffles, the notches of the left connecting member and the right connecting member face each other, the first end of the left support rod of the middle support rod is inserted through the notch of the left connecting member to be supported on the support plate of the left connecting member, the first end of the right support rod of the middle support rod is inserted through the notch of the right connecting member to be supported on the support plate of the right connecting member, the left support rod and the right support rod of the middle support rod each have an aperture corresponding to the perforation of the support plate.

4. The adjustable bed frame structure as claimed in claim 1, wherein each of the left side rod and the right side rod is a single rod, the first end of each of the left support rods and the right support rods of the head support rod, the middle support rod and the tail support rod, connected to one of the left side rod and the right side rod, is provided with a U-shaped connecting member having an opening facing up and corresponding to one of the left side rod and the right side rod, and the U-shaped connecting member has an aperture to mate with the corresponding side leg.

5. The adjustable bed frame structure as claimed in claim 4, wherein the U-shaped connecting member is integrally formed with one of the left support rod and the right support rod of one of the head support rod, the middle support rod and the tail support rod.

* * * * *